June 26, 1962  C. L. WEBSTER  3,040,847
PARTITION CONSTRUCTION
Filed April 28, 1960
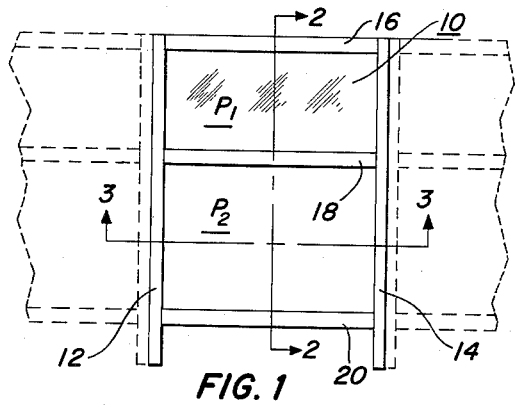
FIG. 1
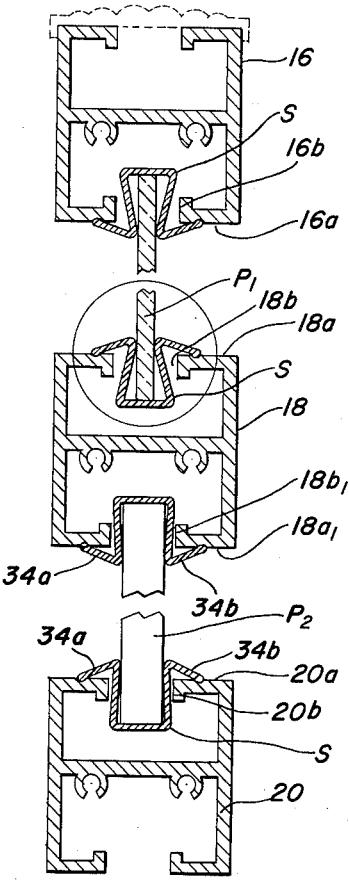
FIG. 2
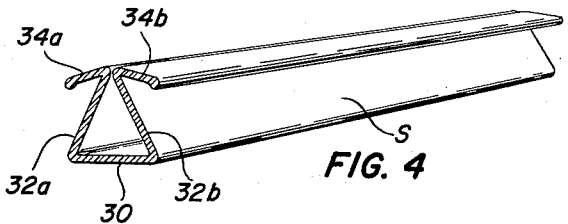
FIG. 5
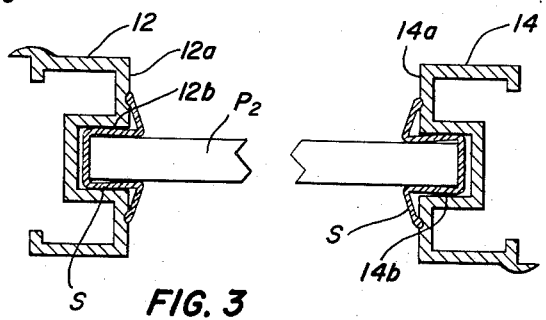
FIG. 4
FIG. 3
INVENTOR
CLIFFORD L. WEBSTER
BY J. Harold Kilcoyne
ATTORNEY

United States Patent Office 3,040,847
Patented June 26, 1962

3,040,847
PARTITION CONSTRUCTION
Clifford L. Webster, Narberth, Pa. (713 Haverford Road, Bryn Mawr, Pa.)
Filed Apr. 28, 1960, Ser. No. 25,370
4 Claims. (Cl. 189—34)

This invention relates to improvements in partition construction, and more particularly to an improved sealing means and structure for sealing the paneling and/or glass to the framework of partition construction or units thereof.

Although not limited thereo, the invention will be described in its application to a partition construction of the type disclosed and claimed in my prior applications Serial No. 764,959, filed October 2, 1958, now abandoned and Serial No. 822,800, filed June 25, 1959. More particularly, such a partition construction comprises a plurality of pre-assembled panel units connected along adjacent edges to like units, each such unit consisting of two vertical half-posts (mounting unit-connecting hardware) and horizontal connecting mullions, the half-posts and mullions thus forming one or more rectangular frameworks for the paneling and/or glass completing the unit, as called for by the particular design of partition. The half-posts and mullions making up the framework or frameworks per panel unit are provided on their inside walls with connecting channels for the reception of said paneling and/or glass, and means are provided for securing the latter within the channels. Such means as were previously employed for securing and/or sealing the paneling and/or glass within the channels of the aforesaid framework were not entirely satisfactory, and it is accordingly the general object of the present invention to provide a simple yet highly effective and thoroughly dependable sealing means and structure effective both for supporting and sealing the paneling and/or glass of the panel units of partition construction in place within the panel-unit framework or frameworks provided therefor, usually constituted by spaced vertical half-posts and horizontal connecting mullions as aforesaid.

More particular objects of the invention are the provision of a sealing and supporting means and structure for the paneling and/or glass of so-called panel units used in partition systems, which is so constructed and arranged as to effectively isolate the paneling and glass from the usually metallic posts and mullions constituting the framework therefor, thus to prevent rattling and vibrational noises caused by contact of the paneling and/or glass on the metal of the framework structure; the provision of a paneling and/or glass sealing means and structure which maintains the paneling and/or glass centered within the channels provided therefor in the posts and mullions making up the framework; the provision of a paneling and/or glass sealing means and structure for use in partition construction whose construction and arrangement is such that it is equally effective with a wide range of paneling materials and/or thicknesses; the provision of a means and structure for sealing the paneling and/or glass within the framework of a partition construction or unit therefor, of which effects its sealing function without the need of close tolerances; and the provision of a paneling and/or glass-to-framework sealing means for use in partition construction which provides the sole means of securement of the paneling and/or glass and thus eliminates the need of the usual fastening hardware to hold same positioned within its framework.

The above and other objects of the improved paneling and/or glass sealing means and structure for use in partition construction according to the present invention will appear from the following detailed description thereof, in which reference is had to the accompanying drawings, wherein:

FIG. 1 is a front elevational view of one typical panel unit of a partition construction or system connected to adjacent panel units shown in broken lines;

FIG. 2 is a partly broken-away vertical section taken along line 2—2 of FIG. 1, which illustrates in detail the improved paneling and/or glass sealing and supporting means and structure according to the present invention;

FIG. 3 is a similar view but taken on the horizontal section line 3—3 of FIG. 2;

FIG. 4 is a broken-away sectional view illustrating a length of the sealing means prior to its being applied to the edge of a paneling and/or glass to be secured and sealed in its framework; and FIG. 5 is an enlarged sectional view of the encircled portion of FIG. 2.

Referring to the drawings in detail, reference numeral 10 (FIG. 1) generally indicates a single panel unit of a partition construction or system made up of a plurality of such units connected along adjacent edges to like units, which latter are shown in dotted lines. Preferably, each said panel unit comprises two spaced vertical half-posts 12, 14, a plurality (three being shown) of horizontal connecting mullions 16, 18 and 20 which form with the half-posts upper and lower frameworks, and paneling and/or glass $P_1$ and $P_2$ enclosed within said frameworks. The half-posts 12, 14 are provided in their inside walls 12a, 14a with confronting channels 12b, 14b and similarly, the adjacent mullion pairs 16, 18 and 18, 20 are provided in their respective inside walls 16a, 18a and 18a', 20a with confronting slots 16b, 18b, and 18b', 20b which constitute mouths of channels formed in the mullion bodies. It will be understood that the channels of each framework communicate with one another, thus to form a continuous, self-contained channel for the reception of the edges of the panel $P_1$ or $P_2$ enclosed therein, which channel is preferably disposed in the central vertical plane of the panel unit.

Although not shown, the half-posts 12, 14 are completed in the course of the erection of the partition by similar but oppositely disposed half-posts, and said half-posts and the completing half-posts will carry self-contained connecting hardware, all as disclosed and claimed in my aforesaid applications Serial Nos. 764,959 and 822,800. It is also to be observed that the number of mullions and paneling and/or sheets employed per panel unit can vary from that shown, depending on the particular partition design or usage; for example, the panel unit may comprise only two mullions (upper and lower) and a single paneling or glass; or it may comprise four mullions as necessary to make up the frameworks for three paneling and/or glass panel units.

For convenience, the afore-mentioned paneling or glass will be hereinafter referred to simply as paneling or as a sheet of paneling or glass. In this connection, it will be noted that FIG. 2 shows the upper paneling $P_1$ to be of glass and the lower paneling $P_2$ to be of some other material suitable for use in partition construction, such as porcelain, steel, formica, wood veneer, Novoply, Duraply, cement asbestos, sheet rock, and the like. In general, the choice of the particular material employed as the non-glass paneling material will depend on the requirements of each partition installation.

According to the invention, the paneling is dimensioned so that its edges will extend a substantial distance into the continuous channel provided therefor in its framework as defined by said posts and mullions, but it will be noted that the depth of insertion of the paneling edge is always susbtantially less than the depth of the channel, and similarly that the paneling has lesser thickness than the width of said channel in which it is received. Thus, the paneling edge and face portions which extend into the channel are uniformly respectively spaced from the channel bottom and sides. Further, both to support the paneling within its oversize channel and also to seal same to the framework structure, the invention provides an elongated sealing and support member (hereinafter for convenience called a strip) of resilient deformable plastic material such as vinyl chloride which is preferably formed by extrusion. Referring to FIG. 4, which illustrates the sectional configuration of such a sealing and supporting strip S prior to its being applied to a paneling edge, the strip has a generally channel-shaped body defined by a bottom wall 30 and side walls 32a, 32b and it is moreover provided with laterally extending flanges 34a, 34b which extend outwardly from the free ends of said side walls and are preferably sloped downwardly-outwardly so that their outer marginal edges have lesser elevation from said bottom wall 30 than do their inner edges which connect to the side walls 32a, 32b. Also to be noted is that the width and depth of the channel-shaped body of the strip S is also somewhat less than the depth and width of the framework channel or channels into which the edges of the paneling are to be inserted, but that the side flanges 34a, 34b of the strip are sufficiently wide that when the paneling with strip applied to its edges is inserted in said framework channel, said flanges will extend well over the inside walls of the posts and mullions in which the framework channel is formed, as will hereinafter appear.

Another feature of the invention is that the channel body of the strip S, as measured by the internal width of its bottom wall 30, has greater internal width than the thickness of the paneling for which it is to be used, and that its side walls 32a, 32b are spring-biased towards one another by virtue of their being convergently sloped in the extrusion process by an amount that their outer or mouth end-edges meet. Such not only adapts the strip S to a plurality of paneling thicknesses but also it provides for the strip resiliently securing itself to the edges of the panel to which it is applied. For example, it will be seen in FIG. 2 that the upper glass-sheet paneling P₁ has substantially lesser thickness than that of the lower paneling P₂ whose thickness approaches that of the full width of the bottom wall 30 of the sealing strip S. Yet the properties of deformability and resilience present in the sealing strip adapts it for use with paneling of such widely different thicknesses.

To secure and seal a paneling within its framework defined by the half-posts 12, 14 and pairs of mullions 16, 18 or 18, 20, it is only here necessary to apply a length of sealing strip S to all edges of the paneling to be secured and thereupon assemble the panel-unit framework about the same in any approved manner, so that the edges of the paneling encased by the sealing strip extend into the framework structure in the manner shown in FIGS. 2 and 3. Consequent to such assembly, the panel will in large measure be supported only by the side flanges 34a, 34b of the strip S applied to its bottom edge since only said flanges make contact and have bearing on the inside upper wall of the lower mullion 18 or 20. Of course, said strip S also seals said lower paneling edge to said inside mullion wall, and its other three edges are similarly sealed to the inside walls of the two vertical posts, and the upper mullion making up the paneling framework.

While paneling edged with a sealing strip S tends to center itself with respect to its framework when assembled thereto as aforesaid, this centering effect can be substantially enhanced by providing the channeled or slotted inside walls of the framework with grooves 40, 42 (see FIG. 5) which are spaced outwardly from the mouth-defining side edges of the channel equal distances such that they will receive the outer under-edge corners of the sealing-strip side flanges 34a, 34b. Thus, not only is the strip construction such that it provides what may be termed a floating support and seal for the paneling within its framework, but also, by virtue of the outer under-edge corners of the flanges in effect seating in and being thereby positioned by the aforesaid grooves 40, 42, said sealing strip functions to effectively center the paneling within its framework.

From the above, it will be readily appreciated that the paneling supporting and sealing means and structure described achieves in simple yet highly effective manner the objectives of the invention as set forth in the foregoing. More particularly, the paneling edge strip S completely isolates the paneling from the metal of its framework and thus eliminates rattling. Another feature of advantage of the paneling sealing and supporting means and structure of the present invention is that it provides an effective paneling-securing means without need of close tolerances, and hence it makes for substantial economies in manufacturing partition constructions, particularly of the prefabricated type. Another advantage is that the herein paneling sealing and securing means performs its various functions in highly effective manner without any requirement of additional fastening hardware to hold the paneling in position with its framework. That is to say, the sealing and securing strip of the invention is the sole means required and employed in securing the paneling in place, again leading to substantial economies in manufacture as compared to the prior paneling mounting and sealing and securing means.

As many changes could be made in carrying out the above constructions without depatring from the scope of the invention, it is intended that all matter contained in the above description or shown in the accompanying drawing shall be interpreted as illustrative and not in a limiting sense.

I claim:

1. In partition construction, spaced vertical and connecting horizontal members defining at least one rectangular framework, the relatively inside walls of said members having connecting channels extending substantially centrally thereof and defining a continuous self-contained channel for the reception of a sheet of paneling or glass to be enclosed by said framework, a sheet of paneling or glass having its edges extending into said continuous channel, said sheet edges having width and depth substantially less than the width and depth of said continuous channel whereby they are spaced from the channel bottom and sides, and means supporting said sheet from and sealing it along its edges to said framework comprising an elongated strip of resilient, deformable material having a channel-shaped body and side flanges extending laterally therefrom in opposite directions, the channel-shaped body encasing the sheet edges and having external width and depth less than the internal width and depth of said continuous channel by an amount also spacing same from the bottom and sides of the continuous channel and the side flanges extending over and bearing on said relatively inside walls of the framework member relatively outwardly from the sides of the continuous channel, said flanges sealing the sheet edges within the mouth of said continuous channel and also providing the sole means of supporting said sheet in position within the framework.

2. The structure defined in claim 1, wherein the side flanges of the elongated strip are inclined in direction such that they make line contact with said inside walls of the framework members along lines which are spaced outwardly from the sides of the continuous channel in which the sheet edges are inserted.

3. The structure defined in claim 1, wherein the flanges of the elongated sealing strip are inclined relatively downwardly and outwardly from the body portion thereof, and the depth of insertion of the sheet edges and the channel-shaped body of the strip in the continuous channel is such that said flanges make only line contact with said inside walls of the framework members along lines coinciding with those of the outer under-edge corners of said flanges.

4. The structure defined in claim 3, wherein said inside walls of the framework members are provided with longitudinal grooves spaced outwardly from the sides of the continuous channel formed therein, and the outer edges of the flanges seat in said grooves.

References Cited in the file of this patent

UNITED STATES PATENTS

| | | |
|---|---|---|
| 2,667,951 | Gall | Feb. 2, 1954 |
| 2,831,553 | Pollock | Apr. 22, 1958 |